March 16, 1943.   C. E. SUMMERS   2,314,175
INTERNAL COMBUSTION ENGINE
Filed July 24, 1940   3 Sheets-Sheet 2

INVENTOR.
CALEB E. SUMMERS
BY *Swan, Frye, & Hardesty*
ATTORNEYS

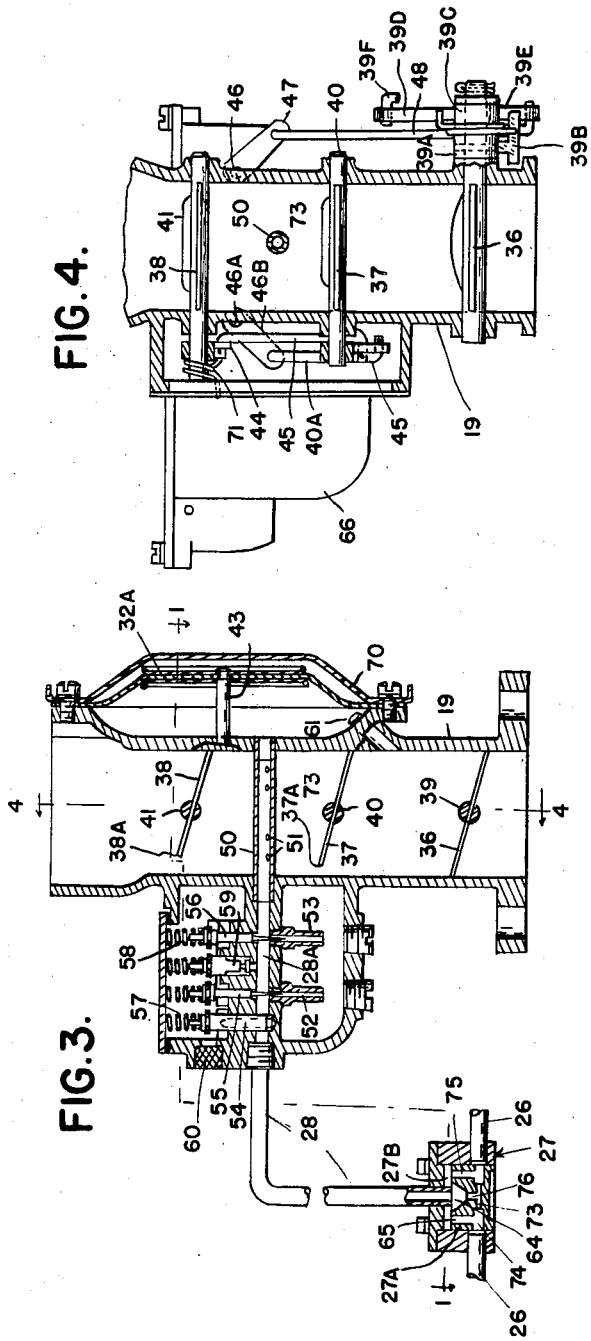
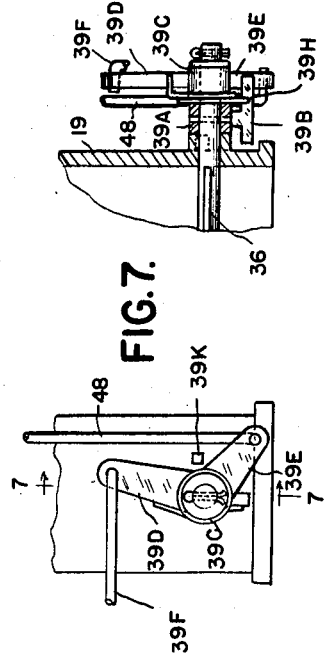

Patented Mar. 16, 1943

2,314,175

UNITED STATES PATENT OFFICE 2,314,175

INTERNAL COMBUSTION ENGINE

Caleb E. Summers, Orchard Lake, Mich.

Application July 24, 1940, Serial No. 347,254

7 Claims. (Cl. 123—191)

The present invention relates to internal combustion engines and their operation and has among its objects the more efficient supplying of fuel thereto and the more efficient utilization of the fuel supplied.

Another object is a method of operation and means by which a substantially full charge of air is introduced into the cylinders at all road loads while the fuel introduced is varied to accord with the load.

Another object is to approach characteristic Diesel part-load efficiency in a motor of relatively low compression.

Another object is a method of operation and means by which, under light load, a segregated charge of fuel-air mixture is burned to, in turn, heat the main and greater charge of air to expand the latter and thereby produce the piston movement.

Another object is to provide for such latter operation under increasing fuel admission up to a predetermined load point and then for substantially discontinuing such segregated action and supplying fuel to the entire charge and igniting the latter.

Still other objects will readily occur to those skilled in the art upon reference to the following description and the accompanying drawings in which Figure 1 is a plan view of the cylinder head and showing a section of the carburetor on line 1—1 of Figure 3.

Figure 3 is a section along the line 3—3 of Figure 1.

Figure 4 is a section along the line 4—4 of Figure 3.

Figure 7 is a partial vertical section on line 7—7 of Figure 8, and

Figure 8 is a side elevation in part of the lower end of Figure 4.

The drawings illustrate by way of example, a portion of a six-cylinder engine but it should be understood that the invention is equally applicable to engines having a greater or less number of cylinders, such as four-cylinder engines or engines having eight, twelve or more.

Figure 2:
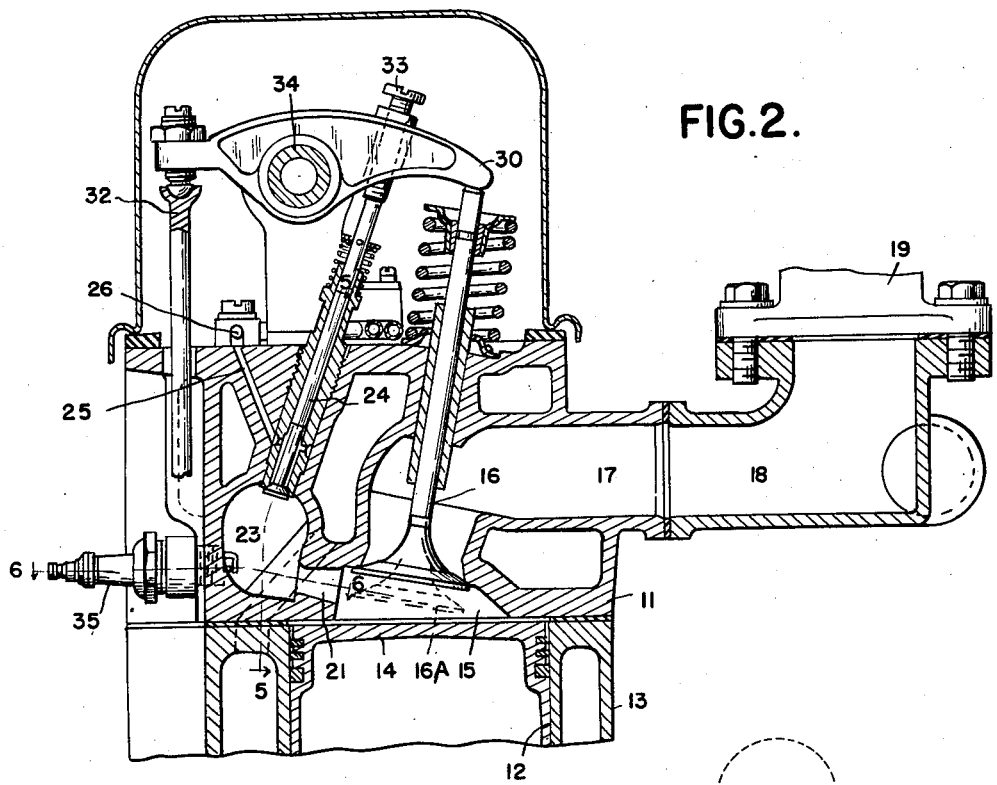
Figure 2 is a vertical transverse section along the line 2—2 of Figure 1, but showing also a section of the intake manifold and carburetor connection.
Figures 5, 6:
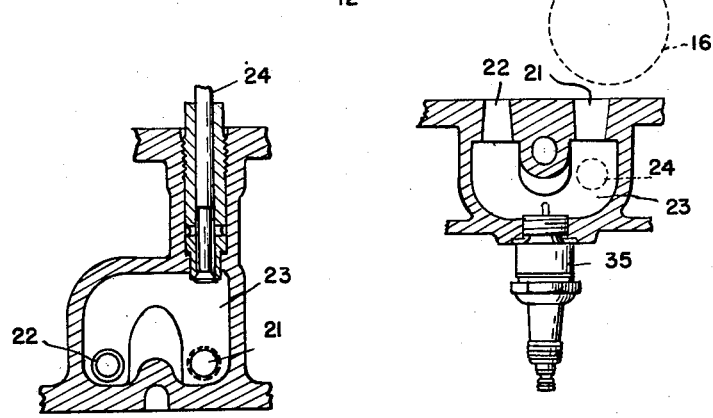
Figure 5 is a section on the line 5—5 of Figure 2.
Figure 6 is a section on line 6—6 of Figure 2.

In the drawings, a portion of the cylinder head is indicated at 11, the cylinders themselves being indicated by the dotted outlines 12. A portion of the cylinder block 13 and also a portion of a piston 14 are shown in Figure 2 and it should be understood that these together with the remainder of the engine, apart from the illustrated and described in detail, are conventional.

In the drawings, a substantially wedge-shaped combustion chamber 15, communicates through inlet valve 16, with the inlet port 17, and inlet manifold 18, thence to the carburetor 19. The combustion chamber 15, also communicates through the horizontally arranged Venturi shaped openings 21 and 22, with a primary combustion chamber 23, this being a small chamber located to one side of the main combustion chamber 15, into which is fed a primary fuel-air mixture by way of the drilled passage 25, tube 26, distributor 27, and tube 28, from the carburetor 19, the flow being controlled by the valve 24.

Figure 1:
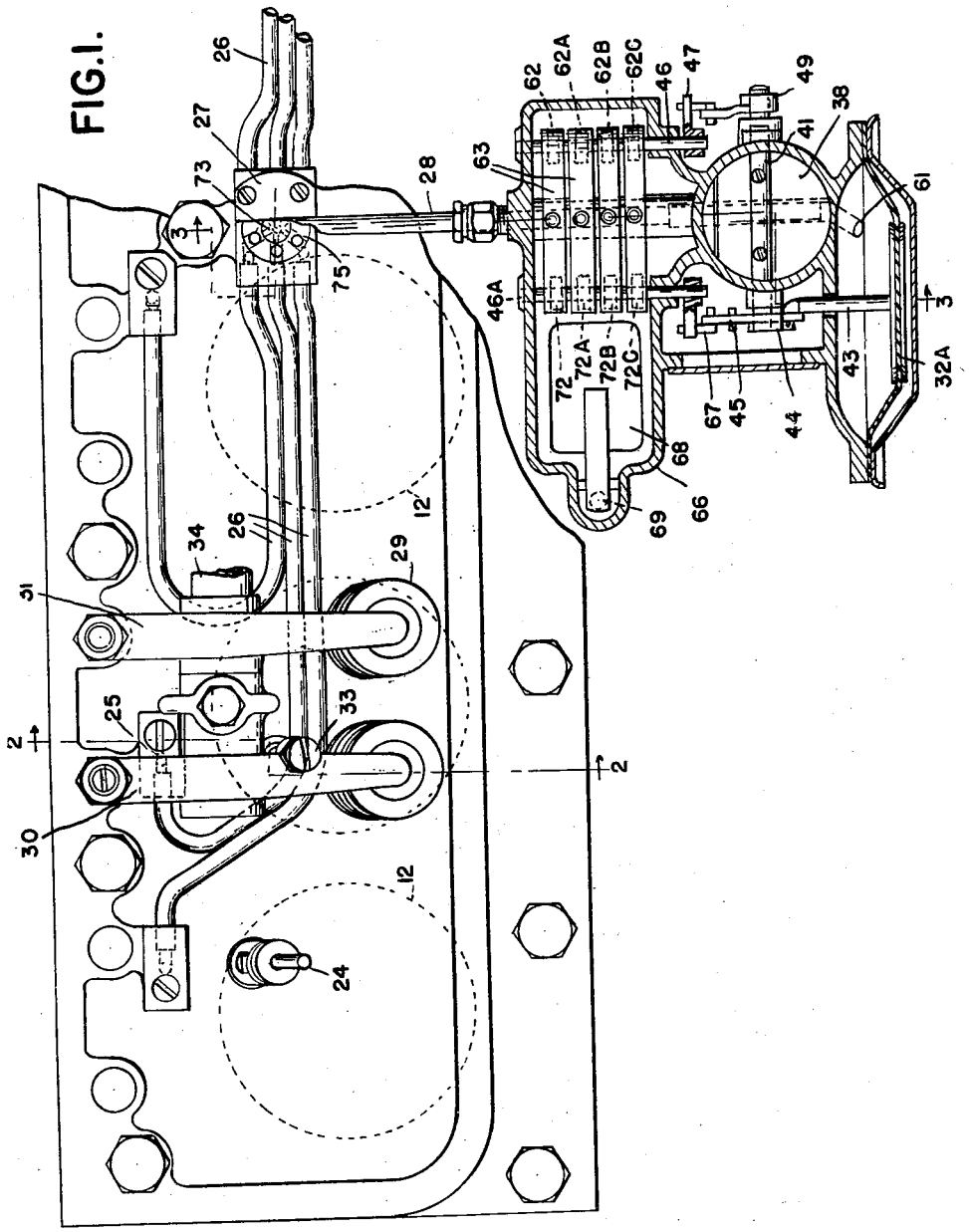

As in the conventional engine, the exhaust valve 29 (Fig. 1 but otherwise not shown) establishes a communication between the combustion chamber 15, and an exhaust port and manifold in the conventional way.

The inlet valve 16, and the exhaust valve 29, are actuated by rocker arms 30 and 31 respectively, the rocker arms in turn being actuated by push rods 32, resting on conventional tappets and cams not shown. The inlet and exhaust valves, therefore, are timed to open and close in the usual way, and serve well-known functions.

The rocker arm 30, however, carries an adjusting screw 33, the lower end of which contacts the valve 24, a suitable lash being allowed between the end of the screw 33, and the top of the valve stem 24; thus when the inlet valve 16 is opened by the rocker arm 30, the small primary inlet valve 24 also opens, the opening of the latter valve being relatively less due to its relatively shorter distance from the shaft 34, about which the rocker arm 30 pivots.

The carburetor 19, provided with a conventional float chamber 66, float 68, and float valve 69, is adapted to deliver fuel through the jets 52 and 53, into chamber 28A, which may discharge through the tube 28, and to the primary chamber 23, or if valve 59 is open, air entering through the filter 60 reverses the flow of the jet 53, so that it discharges through the openings 51 into the throat of the carburetor.

In the throat of the carburetor are two valves 37 and 38, actuated by their respective throttle shafts, 40 and 41, and linked together by the linkage 45. These are controlled by a diaphragm 32A and the rod 43, while a spring 71, normally tensions the valves toward closed position. They, however, cannot close completely since they each have a portion removed as indicated at 37A and 38A.

As the main throttle 36 is opened and the suction of the motor through drill 61 tends to create a vacuum on the diaphragm 32, air pressure entering through opening 70 on the opposite side forces the diaphragm in a direction to open the valves by means of the rod 43 and the crank 44. This movement will continue until the valves are sufficiently open so the pressure difference on the two sides of the diaphragm is just balanced by the tension of the spring 71. Thus at all operating speeds a low vacuum is maintained in the chamber 73 adjacent the discharge nozzles which together with the position of metering pins 55 and 56, meter the fuel. Also, a greater vacuum is maintained below the second valve which is impressed through the manifold 18 to the combustion chamber 23, so there is a tendency to flow from the carburetor through the tube 28. When the motor operates at less than approximately two-thirds load, the metered fuel is all conducted to the combustion chamber 23. When greater than two-thirds torque is required, the valve 59 is lifted off its seat and atmospheric air drawn in through the filter 60, and supplies more air than is discharged through the tube 28, so that the flow is reversed and air and fuel issue through the openings 51 into the throat of the carburetor and thus by way of the main manifold into the motor. The fuel metered by pin 55 continues to flow through tube 28.

Metered fuel and air flowing in tube 28 toward the primary combustion chamber 23, flows into the distributing block 27 (Fig. 3), which distributor block 27 is connected to each cylinder by a separate tube as 26. These tubes are made to be of substantially the same length so their resistance to flow will be substantially equal. The function of the distributor block is to distribute the fuel from tube 28 equally between the various (in the case shown, six) cylinders.

The distributor block designated as a whole by numeral 27, consists specifically of an outer casing partially filled by a block 27A leaving a small chamber 27B in the upper portion, which block is provided with an axial passage 76, flared at its upper end to provide a funnel 64.

The passage 76 at its lower end divides into branches 73, one for each cylinder, which branches are enlarged near their ends and are connected each to a tube 26. Further, each branch 73 opens through a passageway 75 to the chamber 27B. The tube 28 also opens into chamber 27B and is positioned directly over the funnel end 64 of passage 76.

In operation, the discharge from tube 28 falls directly into funnel 64 and is distributed through passages 76, 73, and 74 to the several tubes 26. Any vapors separated in the funnel 64 will also be distributed to tubes 26 through the passages 65 and 74, so that there will be equal distribution of both the liquid and vaporous elements of whatever mixture is led in through tube 28.

The metering pins 55 and 56 and valve 59 and a second valve 54 are all operated by means of cams fixed to two shafts 46 and 46a, respectively, the shaft 46 being connected in operating relation through link 48 and crank arms 47 and 49 to the throttle shaft 39, and the shaft 46A being operatively connected to valve shaft 40 through crank 46B and link 40A.

The cams 62, 62A, 62B and 62C fixed to shaft 46 and cams 72, 72A, 72B and 72C, fixed to shaft 46A, lie under the cross bars 63 which actuate the metering pins and valves and are so formed and arranged as to actuate the pins and valves as follows:

Valve 54, being solely a throttle valve and used to control the flow of mixture to the chamber 23, is actuated only by cam 62, the cam 72 being circular and acting only as a support for the other end of the bar 63.

The cams 62B and 72B controlling the valve 59 are preferably of such form that the valve is not opened by the rotation of either cam by itself, but requires the action of both. The cams 62A, 62C, 72C, 72A may be given any desired form as to control the movements of the pins 55 and 56 chiefly by the movement of the air valves 37 and 38. For instance, the pin 55 is slightly open at idling and as the motor demand increases, will be lifted by the opening movement of the valves 37 and 38, cam 72A being arranged to cause such lifting while cam 62A is arranged to have no effect. With further increase in motor demand to and beyond a predetermined point, throttle movement begins to lift pin 56 through the action of cam 62C and the pin 55 is lowered somewhat.

With the throttle 36 wide open and valves 37 and 38 also open, pin 55 is nearly closed, pin 56 is well opened, and the valve 59 also open.

The action of the combustion chambers is as follows:

As the piston 14 moves downward on the intake stroke, the valve 16 opens to admit a new charge of air or mixture. The valve 24 also opens permitting a small volume of rich mixture to enter the primary combustion chamber 23. It will be noted the valve 24 is not located symmetrically with respect to the chamber 23, but is over to one side adjacent to the opening 21, which is adjacent to the inlet valve 16. When the inlet valve 16 is open, as indicated by the position 16A, the flow of air through the valve 16 is deflected so as to enter the passage 21, and to partially scavenge the chamber 23; but owing to the distant location of the valve 24, from the outlet 22, no part of the primary charge which has entered through the valve 24, leaves the chamber 23.

As the piston 14 moves to upper dead center on the compression stroke, a portion of the gases above the piston is forced through the combustion chamber 15, through the passages 21 and 22 into the primary combustion chamber 23. The tangential entry of this stream of air gives rotation to the mixture within the combustion chamber 23, sweeping the richer part of the mixture toward the longitudinal middle of the chamber and toward the electrodes of the spark plug 35. Since the spark will be thrown in advance of dead center, and the air will still be flowing into the chamber 23, through the openings 22 and 21, the expansion resulting from the ignition of the primary charge will reverse the flow through the openings 21 and 22. The first to enter the combustion chamber 15 is the entrained air, after which the products of combustion will discharge from chamber 23 into chamber 15.

Preferably the passage 21 is venturi shaped and its easier flow direction is out of combustion chamber 23, while the passage 22 is also venturi shaped and its easier flow direction is into combustion chamber 23. During compression, the flow is into chamber 23 through both passages but more rapidly through passage 22. Ignition occurs while gases are still flowing into chamber 23, but as combustion and expansion proceed, the pressure in chamber 23 becomes greater than in chamber 15. At the moment of this reversal, flow continues into chamber 23 through passage 22, and out of chamber 23 through passage 21. When combustion has reached every part of chamber 23 there will be another interval of balanced pressures in which there will be a flow out of chamber 23 through passage 21 and a flow into chamber 23 through the passage 22.

As the unburned mixture forced into chamber 15 unites with the oxygen and expands, the gases surge again into chamber 23 to be followed at equilibrium pressures by a continued flow into chamber 23 through passage 22 and a flow out of chamber 23 through passage 21. This reverberating pressure action between the two chambers 15 and 23, and the flow characteristics of the two Venturi shaped passages 21 and 22, cause a commingling of the gases of the chambers 15 and 23, so that the over-rich mixture of chamber 23 is completely oxidized, partly by being blown into chamber 15, which has excess oxygen, and partly by the oxygen-rich gases of chamber 15 being forced or drawn into chamber 23. All this occurs by the time the piston is a little past top dead center.

The maximum richness of the mixture in chamber 23 will be about two and one-half times that of a balanced mixture. This will occur at full-load low speed when there is relatively a great time interval. To expedite the interchange of gases between chambers 15 and 23, the passages, 21 and 22, are made relatively large. This large size slows down the velocity of burning gases emerging from chamber 23 and together with the horizontal arrangement of passages 21 and 22 prevents the gases from impinging forcefully on the wall of chamber 15.

To illustrate the method of operation, we will assume two load and speed conditions. In case I with the motor idling, the speed is gradually raised from five miles per hour to maximum speed. In case II, the throttle is open wide at five miles per hour and held in that position as the speed increases to maximum.

In starting the motor, after turning on the ignition, the operator partially opens the throttle valve 36 and through the cooperation of the linkage, and the cams 62 and 62A at the same time opens somewhat valves 54 and 55. This provides for the admission, when the engine is cranked, of air to the cylinders and of a rich mixture of fuel and air to the distributor 27 and thence to the chambers 23, when of course, such mixture is fired by the spark plugs.

*Case I*

With the motor idling, throttle 36 is practically closed, maintaining a vacuum in the manifold of approximately ten inches of mercury, and valves 37 and 38 are at or near the closed position, the leakage past the cut off edges of the valves 37 and 38, and valve 36 cracked open being sufficient to supply the motor with air. Fuel is being fed only through jet 52, which discharges through pipe 28, the distributing tubes 26 through valve 24 into chamber 23, jet 53 remaining closed. The quantity of fuel delivered is just sufficient for a balanced mixture or a slightly richer than balanced mixture with the air forced by compression into chamber 23, valve 54 opening proportionately to the throttle 36 is also nearly closed. The charge is ignited by the spark plug, 35, and the products of combustion flow out into the main combustion chamber 15 through passages 21 and 22.

As the load increases up to 40% full torque, i. e., the higher torque required to drive the car at a higher speed, there is no fundamental change in the method of fuel handling. The throttle 36 will open somewhat more, and with it, the valve 54; the increase in the vacuum above the throttle, transmitted to the diaphragm chamber through passage 61 causes the diaphragm 32 to open the valves 37 and 38; the metering pin 55 controlling the jet 52 will be lifted by the cams 62A and 72A, so more fuel will be conducted to chamber 23 to maintain a balanced mixture with greater volume of air entering. At approximately 40% torque, chamber 23 reaches its full load condition; that is, chamber 23 filled with a balanced mixture at substantially air pressure will give the motor a torque equivalent to 40% of the maximum torque.

As more torque is required, and as the throttle is therefore opened further, the metering pin 56 starts to lift due to the linkage 48 and to cams 62B and 72B, and brings the jet 53 into action. This fuel also discharges through tube 28 and to the combustion chamber 23, thereby making an over-rich but finally approximately double the richness required for balanced mixture. This rich mixture when ignited by the spark plug 35, expands and discharges into chamber 15 through passages 21 and 22, combustion being completed by the oxygen contained in the air charge in combustion chamber 15. Also, owing to the disposed venturi shapes of passages 21 and 22, a circulation occurs between the combustion chamber 23 and the combustion chamber 15, so the oxygen of combustion chamber 15 is carried into chamber 23 as the over-rich mixture of combustion chamber 23 is carried out to unite with the oxygen in combustion chamber 15. Thus during the intervals between ignition and the time when the piston has started on its downward working stroke, combustion is completed in both chambers.

When approximately ¾ torque is reached and at a speed above forty miles per hour, the position of cams 62B and 72B combine to lift the valve 59, which admits atmospheric air between the jets 52 and 53. The volume of air admitted by valve 59 is greater than the volume of air which is being drawn through tube 28, so a reversal of flow occurs with respect to the discharge from jet 53. The fuel from jet 53 therefore discharges through the tube 50 through the openings 51, and mingles with the air passing through the carburetor and enters the engine through the main manifold 18, and the inlet ports 17. Thus at approximately ¾ load there is a sudden change from all fuel in chamber 23 making an over-rich mixture therein to a substantially balanced mixture in chamber 23 and slightly more than half the balanced mixture in chamber 15. This rare-mixture would not be ignitable by a spark but is ignitable by the two flames which issue through passages 21 and 22.

As the load further increases up to maximum torque, and the valve 36 opened wider to meet such increase, the valves 37 and 38 open wider, and the metering pin 56 lifts higher, supplying more fuel to be discharged through the tube 50 and the openings 51 into the main manifold. The full load and the high speed ideal condition is a slightly over-rich mixture in chamber 23, and a slightly under-rich mixture in chamber 15, so that the total ratio of fuel to air is just balanced. It is noted that the metering pins 55 and 56 and the valve 59 are actuated by the joint movement of the cams 62A, 62B, 62C and 72A, 72B, 72C acting on their bars 63. The cams 62, 62A, 62B, 62C are actuated by a linkage connecting with the main throttle 36 while the cams 72A, 72B and 72C are actuated by a linkage connecting with the air valves 37 and 38; valve 54 is actuated solely by cam 62, the cam 72 being circular and acting only as a support for its bar 63.

*Case II*

Where the throttle is open wide at low speed, and full torque at low speed is required, the throttle 36 is opened wide and therefore assumes a vertical position. The accelerator rod carries the throttle crank 36A still further and actuates the cam 62 after the throttle 36 is wide open. Metering pins 55 and 56 are opened to positions proportioned by the air valves, 37 and 38, also the throttle 36, so as to supply sufficient fuel to give a balanced mixture to all the air entering the motor. At the lower speeds, however, all this fuel flows through the tube 28 and is ignited in chamber 23. As the speed increases to approximately 30 miles per hour, the position of the air valves 37 and 38 is such that the cam 72 in conjunction with the position of cam 62 actuated by the wide open throttle lifts the valve, 59, off its seat, so the fuel from jet 53 discharges into the main manifold. By keeping all fuel in chamber 23 at the low speed, detonation is prevented. By switching the fuel to both chambers at the higher speed, rapid combustion is obtained.

Since, under the conditions just stated, it becomes desirable to move the cams 62 to 62C after the throttle valve 36 is wide open, mechanism must be provided for this purpose. Such mechanism is clearly shown in Figures 4, 7 and 8.

In these figures the shaft 39 for valve 36 is shown as having fixed thereto the hub 39A carrying a T-shaped arm 39B, and has loosely mounted thereon the hub 39C provided with two arms 39D and 39E, set at a suitable angle, and connected respectively to the foot or hand throttle lever (not shown), or both, through link 39F, and to crank arm 47 through link 48.

Hub 39C is maintained upon the shaft by means of a suitable washer and cotter. The two hubs are rotatable together through the action of a suitable spring 39H, which holds one branch of the T-shaped arm 39B against the rearward surface of arm 39E and, when rotated to full throttle position, the other branch of arm 39B strikes a stop 39K, allowing arm 39E to continue its movement.

Having described the invention and the preferred embodiment thereof, what is claimed is:

1. In an internal combustion engine, a primary combustion chamber having ignition means therein, and a secondary combustion chamber into which the ignited gases from the primary chamber discharge, the discharge passages being venturi shaped and being directed toward the most distant surfaces of said secondary chamber.

2. An internal combustion engine having primary and secondary combustion chambers connected by a plurality of passages, and inlet valves for each of said chambers, the said inlet valves being located closer to the ends of one of said passages than the other.

3. An internal combustion engine having primary and secondary combustion chambers connected by a plurality of passages, an inlet valve for said secondary chamber in approximate alignment with the axis of one of said passages and means for directing scavenging air into said primary chamber through the said passage.

4. In an internal combustion engine of the valve-in-head type, a secondary combustion chamber having an abrupt wall at one side with the upper wall sloping downwardly therefrom, and a primary combustion chamber connected to said secondary chamber by substantially horizontal passages through said abrupt wall.

5. In an internal combustion engine having cylinders and pistons, a primary combustion chamber and a secondary combustion chamber, the latter being located in a cylinder of said engine over the piston, said combustion chambers being connected together through two similar Venturi shaped passages.

6. In an internal combustion engine having cylinders and pistons, a primary combustion chamber and a secondary combustion chamber, the latter being located in a cylinder of said engine over the piston, said combustion chambers being connected together through two similar Venturi shaped passages, said passages having their directions of easier flow oppositely disposed.

7. In an internal combustion engine, a primary combustion chamber and a secondary combustion chamber connected by two similar but oppositely disposed Venturi shaped passages, the size and proportions of said passages being adapted to the rapid simultaneous flow of gases out of a chamber through one of said passages and into the same chamber through the other of said passages.

CALEB E. SUMMERS.